US012560507B1

(12) United States Patent
Roxas et al.

(10) Patent No.: US 12,560,507 B1
(45) Date of Patent: Feb. 24, 2026

(54) SYSTEMS AND METHODS FOR PREDICTING PIPELINE LEAKS BASED ON PRESSURE DATA

(71) Applicant: VANMOK INC., Edmonton (CA)

(72) Inventors: Michael Roxas, Edmonton (CA); Satya Mokamati, Edmonton (CA)

(73) Assignee: VANMOK INC., Edmonton (CA)

( * ) Notice: Subject to any disclaimer, the term of this patent is extended or adjusted under 35 U.S.C. 154(b) by 0 days.

(21) Appl. No.: 19/199,923

(22) Filed: May 6, 2025

(51) Int. Cl.
| | |
|---|---|
| *G01M 3/28* | (2006.01) |
| *G06N 3/0442* | (2023.01) |
| *G16Y 10/35* | (2020.01) |
| *G16Y 40/10* | (2020.01) |

(52) U.S. Cl.
CPC ........ *G01M 3/2815* (2013.01); *G06N 3/0442* (2023.01); *G16Y 10/35* (2020.01); *G16Y 40/10* (2020.01)

(58) Field of Classification Search
CPC ............ G01M 3/00; G01M 3/26; G01M 3/28; G01M 3/2807; G01M 3/2815; G06N 3/0442; G16Y 10/35; G16Y 40/10
See application file for complete search history.

(56) References Cited

U.S. PATENT DOCUMENTS

| | | | |
|---|---|---|---|
| 12,055,464 B2 | 8/2024 | Chen et al. | |
| 2023/0204166 A1* | 6/2023 | Madeira | F17D 5/02 |
| | | | 73/40 |
| 2023/0221207 A1* | 7/2023 | Shao | G01M 3/243 |
| | | | 73/592 |

FOREIGN PATENT DOCUMENTS

| | | | | |
|---|---|---|---|---|
| BR | 102022022336 A2 * | 9/2023 | .............. | G01M 3/26 |
| CN | 111022941 A * | 4/2020 | .............. | F17D 5/06 |
| CN | 117332324 A * | 1/2024 | .............. | F17D 5/02 |
| CN | 118257974 A * | 6/2024 | ......... | G06F 18/2131 |

(Continued)

OTHER PUBLICATIONS

BR-102022022336-A1 Machine Translation (Year: 2023).*

(Continued)

*Primary Examiner* — Nguyen Q. Ha
(74) *Attorney, Agent, or Firm* — McGlew and Tuttle, P.C.

(57) ABSTRACT

A computer implemented method is provided to detect pipeline leaks in a pipeline utilizing one or more sensor devices, each located adjacent the pipeline. The method comprises capturing, from each of the one or more sensor devices, discrete pipeline pressure measurements at discrete instances in time at each sensor location; extracting, by a processor of an IoT Gateways associated with each of the one or more sensor devices, a plurality of key parameters from each of the discrete pipeline pressure measurements; transferring, via the IoT Gateways, the plurality of key parameters to a cloud system; processing in the cloud system, the plurality of key parameters by using a recurring neural network (RNN) to calculate and reconstruct patterns of the key parameters; comparing the reconstructed patterns to historically collected patterns from pipeline operations to determine a reconstruction error in the reconstructed patterns; and evaluating the reconstruction error by applying multi-threshold filtering to enhance anomaly detection robustness to determine presence of a pipeline leak. A computer system and a nontransitory computer-readable medium containing program are also provided.

19 Claims, 12 Drawing Sheets

(56)         References Cited

FOREIGN PATENT DOCUMENTS

KR          20220167511  A   *  12/2022   ............... G06N 3/08

OTHER PUBLICATIONS

CN-117332324-A Machine Translation (Year: 2024).*
CN-118257974-A Machine Translation (Year: 2024).*
KR-20220167511-A Machine Translation (Year: 2022).*
CN-111022941-A Machine Translation (Year: 2020).*
Roxas et al., "Leak Detection for Liquid Hydrocarbon Gathering Lines" (ShortLines), May 7-10, 2024, 13 pages, Charleston, South Carolina, United States.
Roxas et al., "Leak Detection Using Pressure Transmitters for Pipeline Networks Carrying Multi-Phase Fluids", Sep. 23-27, 2024, 10 pages, Calgary, Alberta, Canada.

* cited by examiner

SYSTEMS AND METHODS FOR PREDICTING PIPELINE LEAKS BASED ON PRESSURE DATA

FIELD

The present disclosure relates to pipeline leak detection and systems and methods for performing the same.

BACKGROUND

A common problem for upstream oil and gas producers is the detection of pipeline leaks in their wellhead gathering pipeline networks and network of pipelines connecting processing facilities. These pipeline networks can be adjacent to water bodies, road crossings such as highways, railways, and can be situated closer to public infrastructure, which means that a leak in such high consequence areas could cause devastating impacts.

Pipeline leak detection should perform as per API 1130 metrics—Sensitivity, Reliability, Accuracy and Robustness.

Due to the high number of pipelines in upstream gathering networks, operators are not able to physically attend to all the pipelines in the network on a regular basis. This can be further complicated for those pipelines operating in remote locations. Real time leak detection on the upstream pipeline gathering networks carrying emulsions from oil wells to separation facilities is very challenging due to the presence of multiple fluid phases in the pipelines.

Short pipeline networks are large in number and they spread across operating areas. A typical pipeline network in an upstream sector of oil and gas production is shown in FIGS. 1a, 1b and 1c. A typical pipeline network in midstream of oil and gas transportation/storage is shown in FIG. 2.

Upstream companies can benefit from an autonomous, real-time and cost-effective monitoring solution for their emulsion pipeline networks to meet regulatory requirements and maintain reputation in their operating areas.

Efforts to minimize pipeline leakage are crucial not only for environmental reasons, but also for ensuring the safety of operating personnel and the general public, along with the reliability of the pipeline infrastructure. Regulatory authorities and industry stakeholders work together to establish and enforce standards aimed at preventing and addressing pipeline leaks.

Since methane is the major gas fraction component in emulsion pipelines, early detection of leaks in pipelines significantly reduces methane and other greenhouse gas emissions and mitigates the negative economic and environmental impacts of climate change.

Typically, hydrocarbon transportation pipelines (either long distance transmission lines or short pipelines) which use internally based leak detection methods such as CPM (Computational Pipeline Monitoring) requires data from flow meters and pressure transmitters (in some applications, temperature and other related information). This data is obtained through SCADA/telemetry which is readily available on most long-distance transmission pipelines. Although, a few CPM methods use Pressure data only (by avoiding data from other instruments which are expensive to install and maintain), these methods depend on data from SCADA which makes this method a not cost effective choice for the pipeline company.

Gathering pipelines that connect well heads and processing facilities typically lack proper instrumentation such as SCADA and flow meters. Typically, Real-Time Transient Model (RTTM) as well as Volume balance-based leak detection methods require the use of flow meters and pressure sensors. Due to the cost of the flowmeters themselves, piping modifications, calibration and annual maintenance required, the total installed cost of the solution can be excessive considering the high number of lateral pipeline connections in the upstream gathering network.

Additionally, obtaining SCADA/telemetry communication at remote sites to obtain process signals can drive project costs higher. Flow assurance related issues from emulsions (such as wax formation in turbine flow meters) make it difficult for instruments to measure flow accurately; sometimes they clog the turbine flowmeters which are commonly used in the upstream industry due to their relatively low cost.

Due to the unavailability of minimum required instrumentation, SCADA/telemetry on the gathering pipeline network and operational complexity, conventional leak detection methods such as volume balance or real time transient modeling are not possible to implement on these pipelines. In addition, the cost-effectiveness of these technologies doesn't make it economically feasible to implement them.

Due to these networks being short in length and large in numbers, they typically do not have proper instrumentation such as flow meters and data acquisition system such as SCADA (expensive to install and maintain). In addition, other challenges with these networks include:

Bi-directional flow, and multiple product batches per pipeline

Thermal or diurnal temperature changes can affect the fluid in a pipeline, causing pressure to increase or decrease accordingly Low operating pressure-just above atmospheric pressure Static operating conditions majority of time U.S. Pat. No. 12,055,464 teaches a system and method for leak detection in pipelines with flowing fluid, using a trained convolutional neural network (CNN) model to pressure surge information from sensors on the pipeline, whereby the pressure surge information consists of timestamps associated with the pressure surge and applying a continuous wavelet transform (CWT); to determine if the determined pressure surge data is a pipeline leak by applying the pressure surge information to an Adaptive Neural-Fuzzy Inference System (ANFIS) model. The method is a supervised machine learning model using a database of pipeline pressure measurement images.

SUMMARY

A computer implemented method is provided to detect pipeline leaks in a pipeline utilizing one or more sensor devices, each located adjacent the pipeline. The method comprises capturing, from each of the one or more sensor devices at its respective sensor location, discrete pipeline pressure measurements at discrete instances in time; extracting, by a processor of an IoT Gateways associated with each of the one or more sensor devices, a plurality of key parameters from each of the discrete pipeline pressure measurements; transferring, via the IoT Gateways, the plurality of key parameters to a cloud system located remotely and separate from the one or more sensor devices; processing in the cloud system, the plurality of key parameters by using a recurring neural network (RNN) to calculate and reconstruct patterns of the key parameters; comparing the reconstructed patterns to historically collected patterns from pipeline operations to determine a reconstruction error in the reconstructed patterns; and evaluating the reconstruction error by applying multi-threshold filtering to enhance anomaly detection robustness to determine presence of a pipeline leak.

A computer system is also provided to detect pipeline leaks in a pipeline utilizing one or more sensor devices respectively located at one or more sensor locations adjacent the pipeline. The system comprises: a processor and memory of an IoT Gateways associated with each of the one or more sensor devices, wherein sensor instructions stored in the memory and executable by the processor instruct each of the one or more sensor devices to: capture discrete pipeline pressure measurements at discrete instances in time at each sensor location; extract, by the processor of the IoT Gateways, a plurality of key parameters from each of the discrete pipeline pressure measurements; transfer, via the IoT Gateways, the plurality of key parameters to a cloud system located remotely and separate from the one or more sensor devices, the cloud system comprising a cloud processor and a cloud memory, wherein cloud instructions stored in the cloud memory and executable by the cloud processor instruct the cloud system to: receive the plurality of key parameters; process in the cloud system, the plurality of key parameters by using a recurring neural network (RNN) to calculate and reconstruct patterns of the key parameters; compare the reconstructed patterns to historically collected patterns from pipeline operations to determine a reconstruction error in the reconstructed patterns; and evaluate the reconstruction error by applying multi-threshold filtering to enhance anomaly detection robustness to determine presence of a pipeline leak.

A non-transitory computer-readable medium is also provided containing program instructions for causing a computer to perform operations comprising: capturing by one or more sensor devices, respectively located at one or more sensor locations adjacent the pipeline, discrete pipeline pressure measurements at discrete instances in time at each sensor location; extracting, by a processor and a memory of an IoT Gateways associated with each of the one or more sensor devices, a plurality of key parameters from each of the discrete pipeline pressure measurements; transferring, by the IoT Gateways, the plurality of key parameters to a cloud system located remotely and separate from each of the one or more sensor devices; processing in the cloud system, the plurality of the key parameters by using a recurring neural network (RNN) to calculate and reconstruct patterns of the key parameters; comparing the reconstructed patterns to historically collected patterns from pipeline operations to determine a reconstruction error in the reconstructed patterns; and evaluating the reconstruction error by applying multi-threshold filtering to enhance anomaly detection robustness to determine presence of a pipeline leak.

It is to be understood that other aspects of the present disclosure will become readily apparent to those skilled in the art from the following detailed description, wherein various embodiments of the disclosure are shown and described by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

A further, detailed, description of the disclosure, briefly described above, will follow by reference to the following drawings of specific embodiments of the disclosure. The drawings depict only typical embodiments of the disclosure and are therefore not to be considered limiting of its scope. In the drawings.

The drawings are not necessarily to scale and in some instances, proportions may have been exaggerated in order to more clearly depict certain features.

DETAILED DESCRIPTION

The description that follows and the embodiments described therein are provided by way of illustration of an example, or examples, of particular embodiments of the principles of various aspects of the present disclosure. These examples are provided for the purposes of explanation, and not of limitation, of those principles and of the disclosure in its various aspects.

The present disclosure provides an approach to monitor pipeline networks for leak detection using algorithms that use high frequency time series pressure data, described in more detail below. The present algorithms uses the pressure data from either a single point on the pipeline, or at beginning and end points of the pipeline network, or at multiple points along the pipeline, to form a closed system that supports creating a decision on whether there is a leak within the pipeline or not. The system described here performs as per API 1130 metrics to be sensitive to small leaks and reliable to avoid false positive alarms.

Figure 1A:
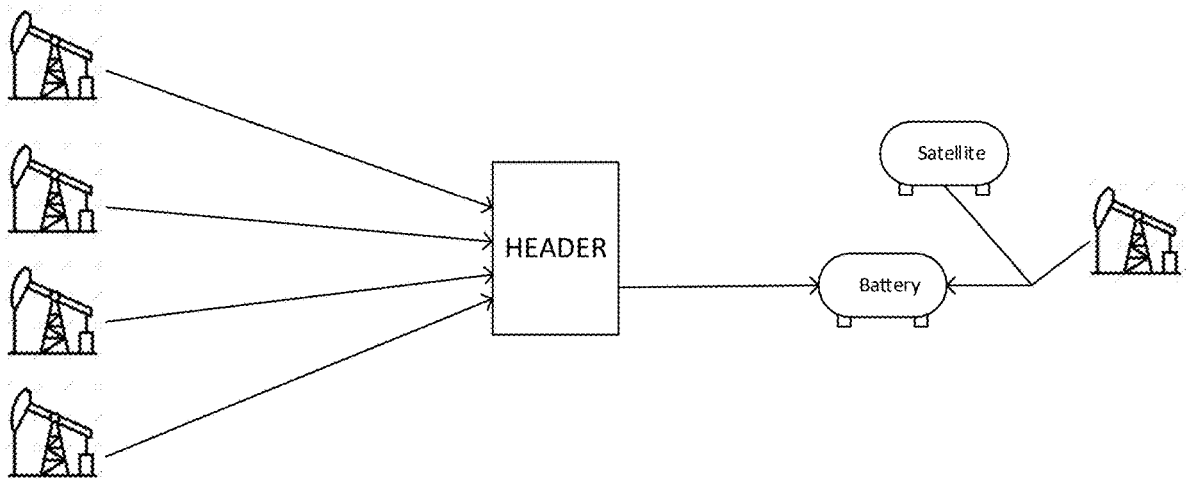
FIGS. 1A, 1B and 1C are schematic diagrams of typical pipeline network in an upstream sector of oil and gas production, for use with the present disclosure.
Figure 1B:
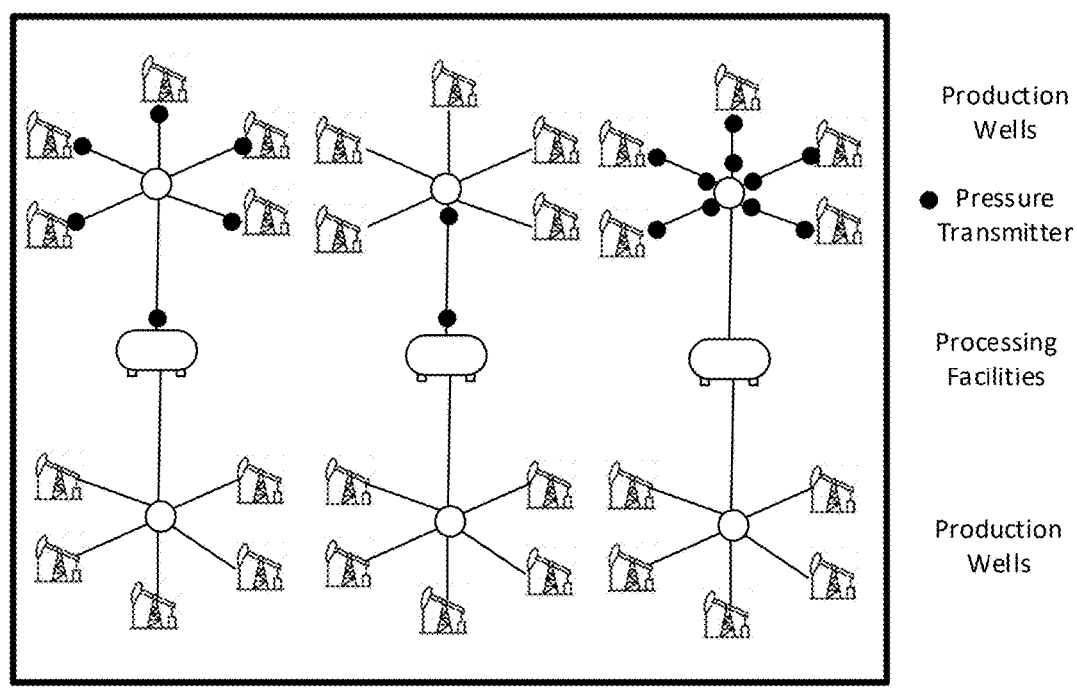
Figure 1C:
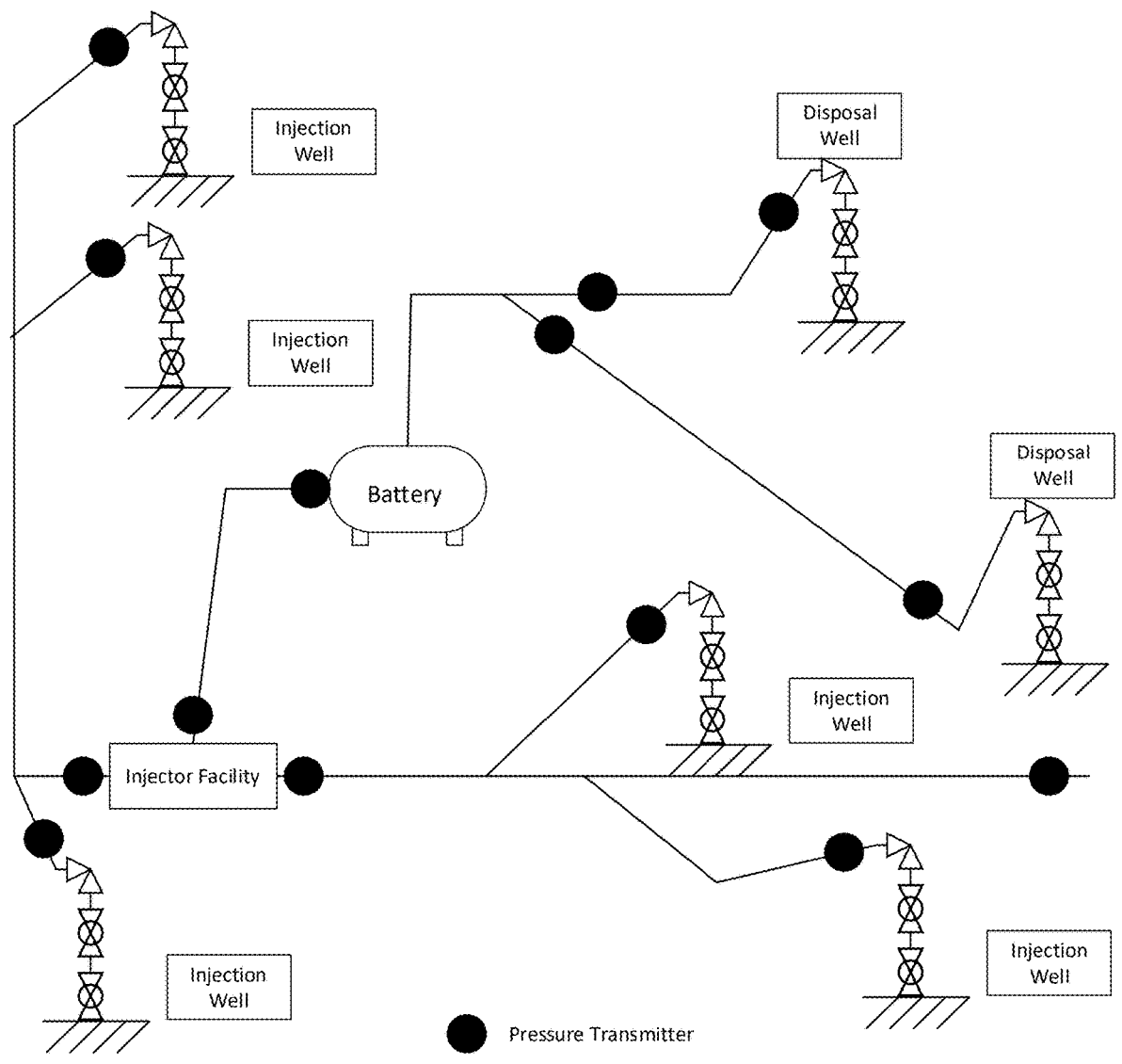
Figure 2:
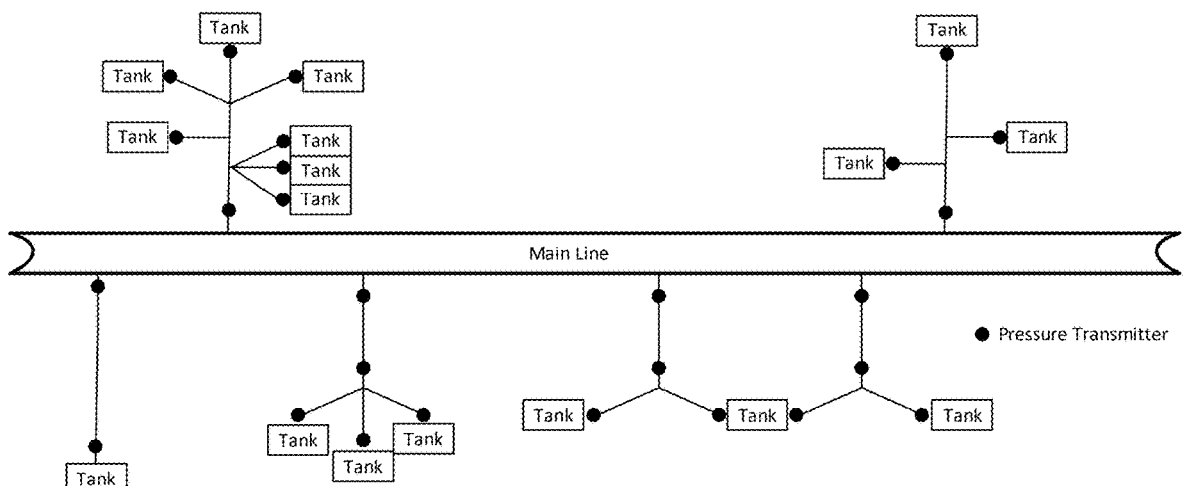
FIG. 2 is a schematic diagram of a typical pipeline network in midstream oil and gas transportation/storage, for use with the present disclosure.
Figure 3:
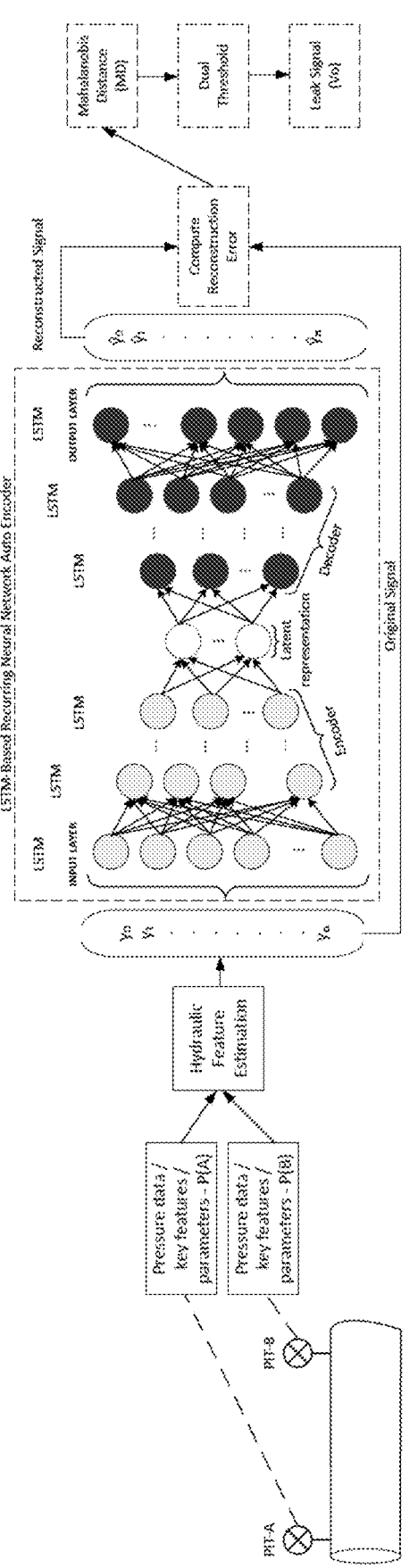
FIG. 3 is a schematic diagram of one embodiment of the system of the present disclosure.
Figure 8A:
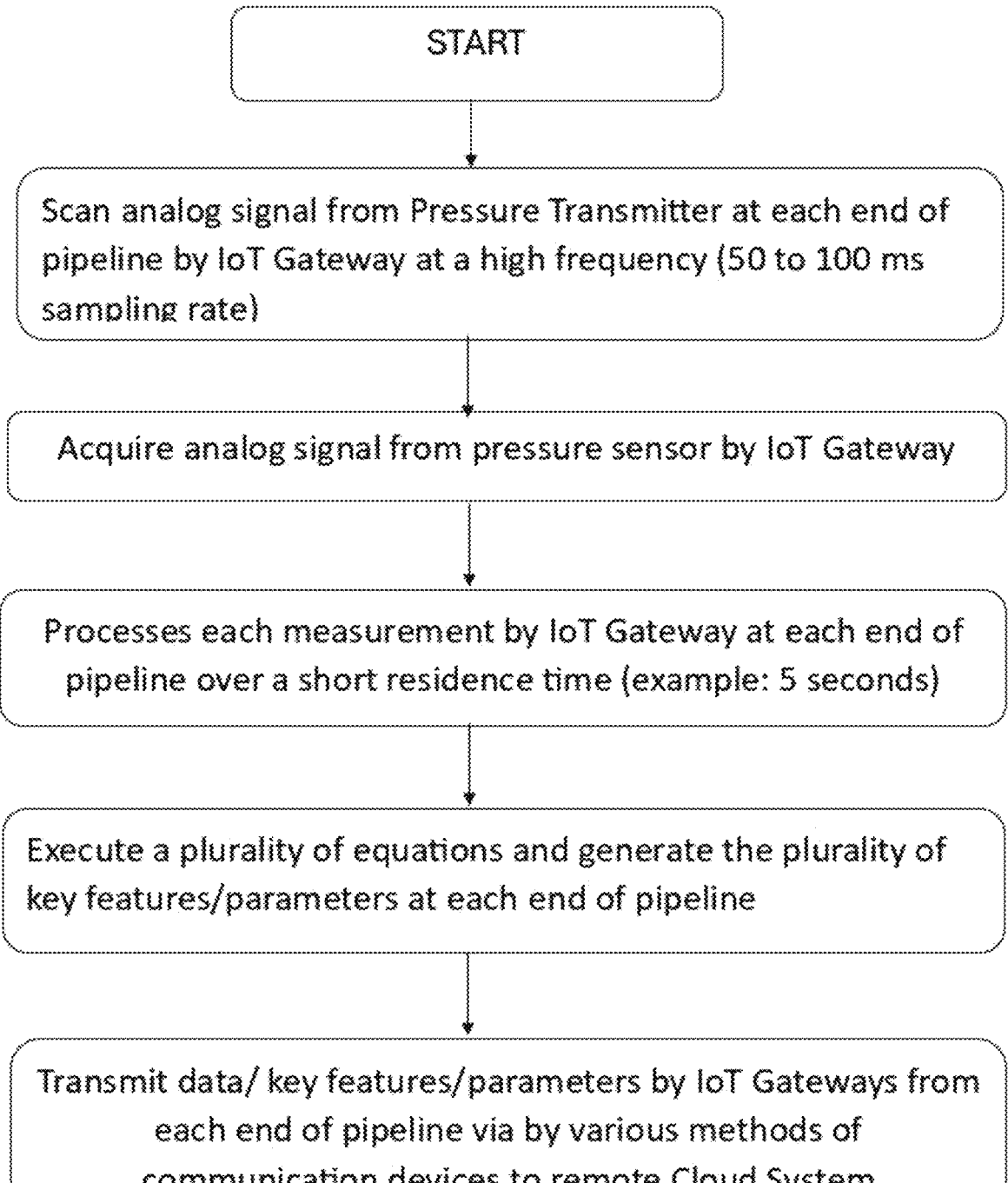
FIG. 8A is a process flow chart of steps taken in the present method at the sensor location.

The present technology uses Internet of Things (IoT) and a Cloud system to harness the pressure sensors data which becomes the only source of data to the algorithms utilized at the cloud system. A general schematic diagram of one example of the system is illustrated in FIG. 3. A flow diagram of the method at the sensor location is illustrated at FIG. 8A.

The pressure sensors in the present system collect instantaneous and discrete pressure data from the pipeline at discrete instances in time. Fluid in the pipeline network does not have to be flowing for the discrete pressure data to be collected, since the present sensors are collecting discrete pressure measurements at discrete instances in time. A single pressure sensor can be used, or a pair of pressure sensors can be used, one at beginning point and one at end point of the pipeline.

Leak detection can be performed in a pipeline or network that is either flowing (Bi-directional or uni-directional) or in shut in conditions. The method can be applied to pipeline that can flow multiple product batches and it can experience thermals or diurnal temperature effects on fluids in the pipeline that would alter the pressure. Additionally, the method is effective for pipeline that can operate at low operating pressures (just above atmospheric pressure).

The present system uses IoT technology, specifically IoT Gateways that are connected to the pressure sensors to scan pressure sensors data at predetermined sampling intervals, for example at 50 to 100 ms per data point, and communicate pressure data and key parameters to a cellular tower and from there to a remote cloud system.

Figure 4:
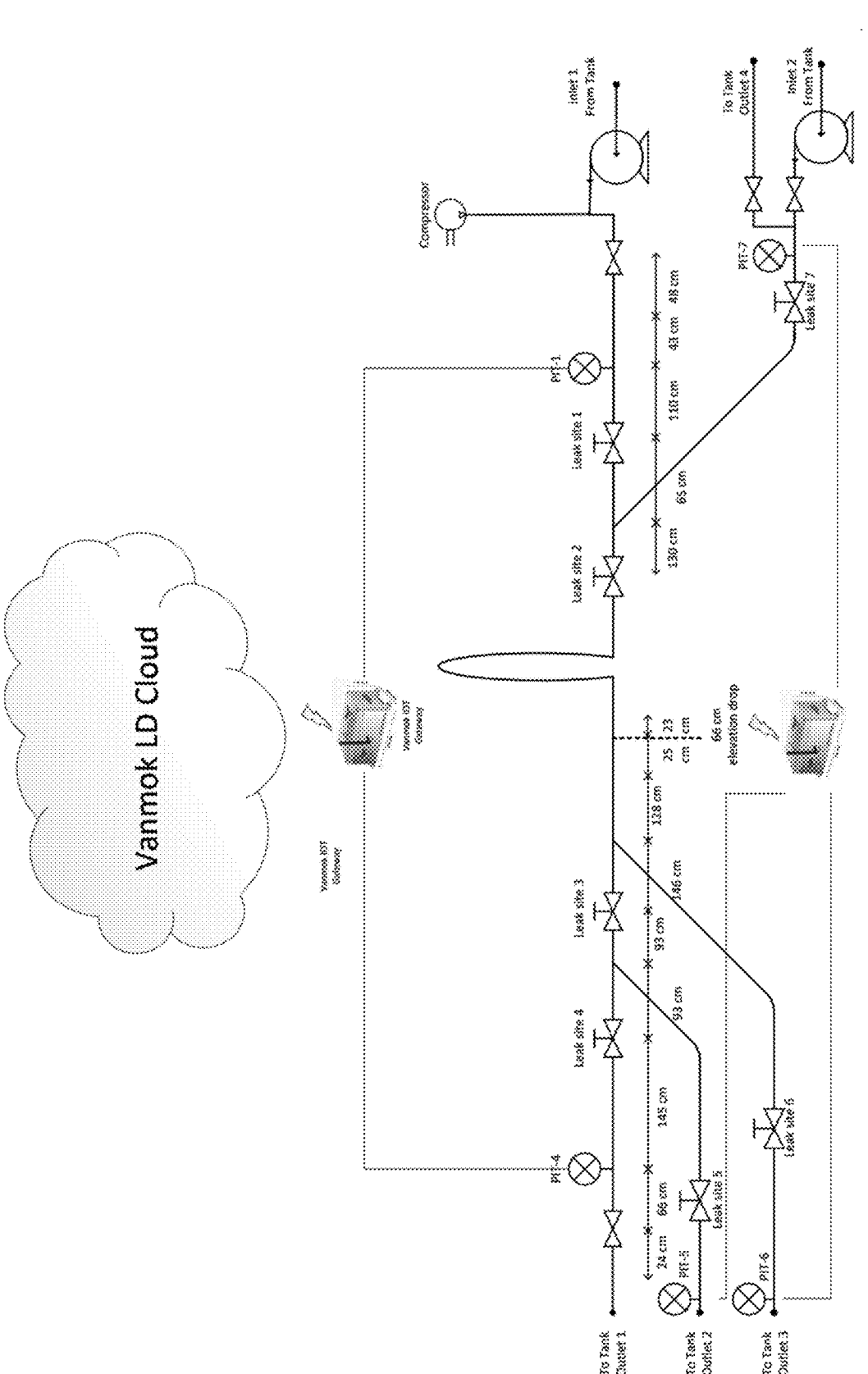
FIG. 4 is a schematic diagram of an arrangement of IoT Gateway devices to obtain the data from each pressure transmitter at the end of pipeline/network.
Figure 5:
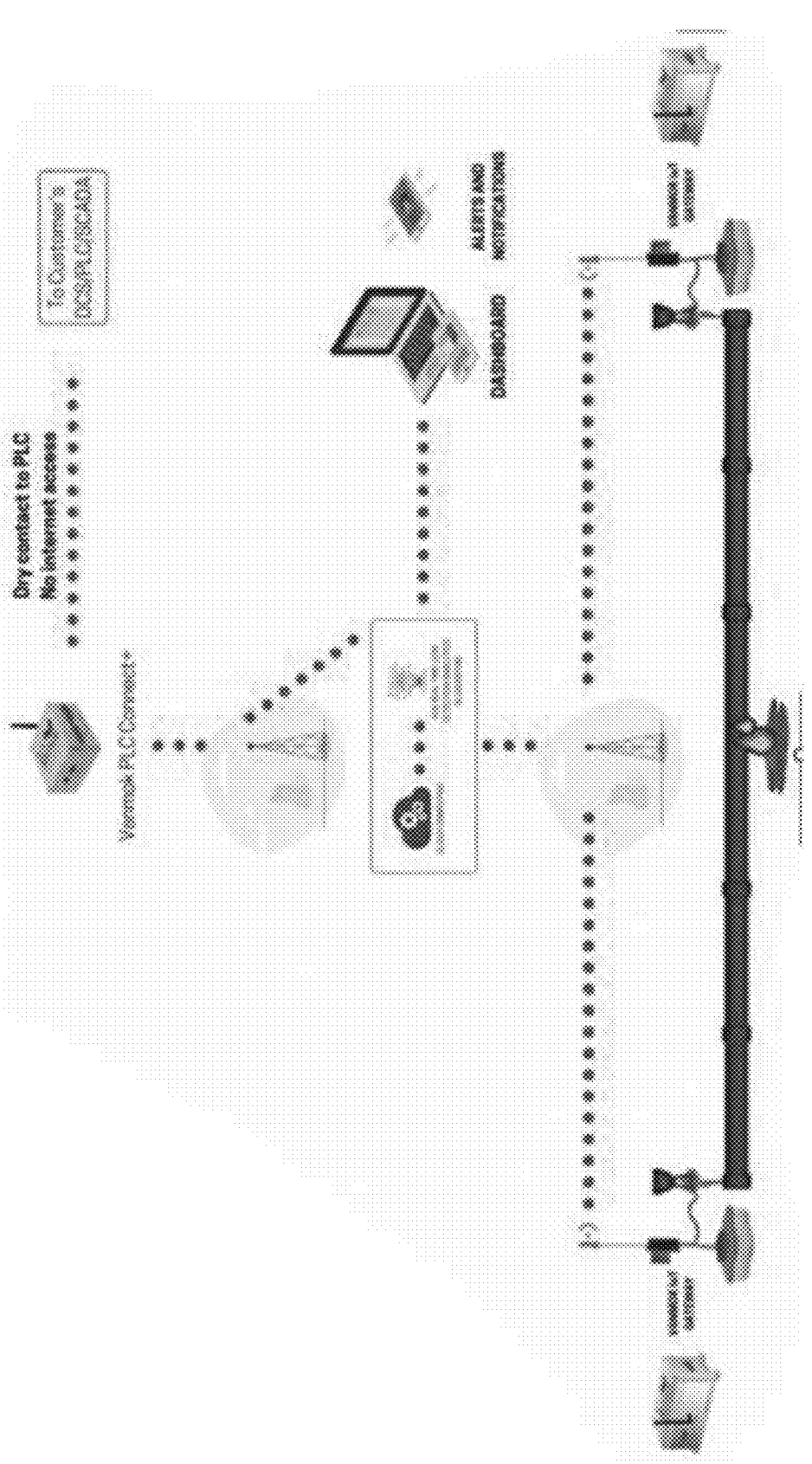
FIG. 5 is a schematic diagram of one embodiment of a system of the present disclosure.

The technology presented uses leak detection algorithms using recurrent neural networks (RNN), and preferably a Long Short-Term Memory (LSTM) based RNN autoencoders, run in real-time at the cloud system to identify anomalies in the pipeline using pressure data received from IoT Gateways. In the event of a leak, the system can direct alarm notifications to customers' smartphones, emails or both. Another IoT device can transmit alarms to customer control systems by offering a dry contact to the Programmable Logic Controller (PLC) at a pipeline facility. This approach eliminates the need for IT infrastructure and, consequently, mitigates cybersecurity threats for the pipeline company. FIG. 4 shows an example of an installation of IoT Gateway devices.

The present algorithms using LSTM recurrent neural network (RNN) autoencoders embody an unsupervised machine learning model. This means that the present algorithms analyze data without predefined labels or output values, and do not require training by reference to a static database of pipeline measurements.

Instead, in the present algorithms and methods uses relationships between available data to identify and interpret patterns.

The present inventors have conducted significant leak prediction and simulation work to test, distill and identify a plurality of features and/or parameters, which, when input to the algorithms, is used by the neural networks to detect and predict leaks, instead of a database. These key parameters and features provide significantly more insightful information to the present unsupervised algorithms at the cloud side, than traditional historical databases used for training prior supervised machine learning algorithms. In this way, the present algorithms do not rely on a predetermined notion of what a pipeline leak would look like.

At the sensor locations, each discrete pressure measurement are mined to extract the plurality of key parameters associated with each particular pressure measurement. The mining of each discrete pressure measurement is conducted within a IoT Gateway connected to each pressure sensor, over a short residence time, for example 5 seconds, to generate the plurality of key features/parameters, which are then communicated by the IoT gateways to the cloud system processors.

Figure 6:
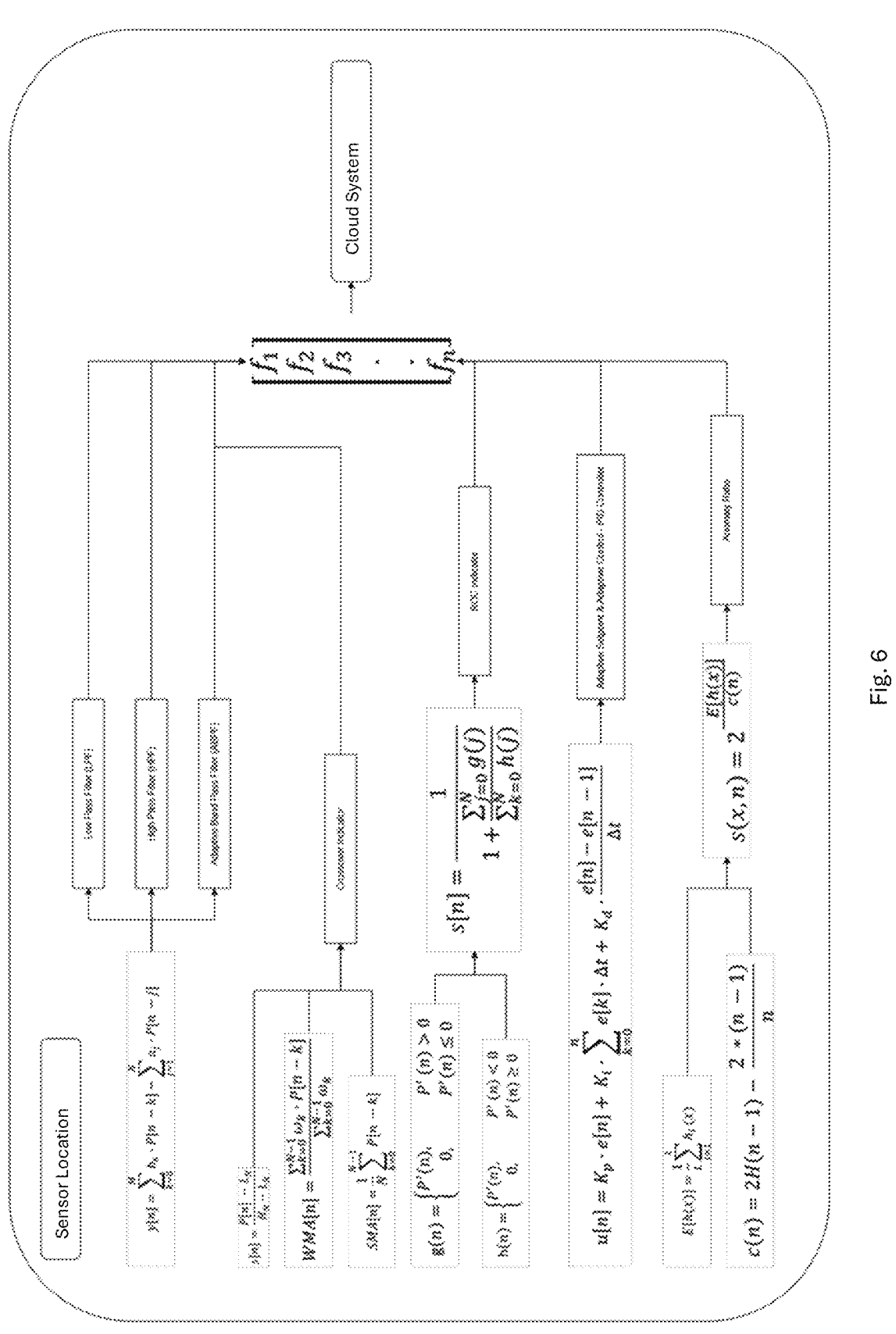
FIG. 6 is a process diagram in relation to calculations performed at the sensor location of the present system.

The key features and parameters are all functions of the pressure measurements and calculated by a microprocessor on the IoT Gateway, based on formulations developed through extensive prediction and simulation work conducted by the present inventors. Some of the formulations to determine some of the key features and parameters are depicted in FIG. 6. The key parameters and features help to identify patterns within the pressure measurements themselves to help to identify anomalies, said anomalies being potentially indicative of leaks.

With reference to FIG. 6, six of the formulas used to determine the multiple key features and parameters include a low pass filter (LPF), a high pass filter (HPF), an adaptive band pass filter (ABPF), a crossover indicated, a rate of change indicator (ROC), and adaptive setpoint & adaptive control—PID control, and an anomaly ratio. These are described in more detail below:

Low Pass Filter (LPF)—This filter is used to reduce the impact of high-frequency noise or sudden spikes in the measured pressure. This ensures a smoother signal despite the high sampling rate of 50 ms, thus reducing the effects of signal noise on the autoencoder which is used at the cloud system.

High Pass Filter (HPF)—This filter serves to reduce the impact of slow baseline drift and sensor offset in the measured pressure signal. This is important since it helps to avoid false alarms due to drift in the pressure measurements; This make it easier for the autoencoder to find anomalies and also to filter out signals that would not be indicative of a leak signal.

Adaptive Band Pass Filter (ABPF)—This filter helps to dynamically isolate the range of pressure signal frequencies that are of most interest, by adapting to changes in signal behavior. By adjusting or adapting the band of this filter in real time, it enhances the detection of anomalous pressure changes that may otherwise be missed by a static bandpass configurations such as in the LPF & HPF.

The formulation for the various data filters is:

$$y[n] = \sum_{k=0}^{M} b_k \cdot P[n-k] - \sum_{j=1}^{N} a_j \cdot P[n-j]$$

Where:
y[n] Output signal at discrete time n
$b_k$ Coefficient for the input signal at lag k
P[n–k] Input signal delayed by k samples
M Maximum lag for the input signal coefficients $b_k$
$a_j$ Coefficient for the output signal at lag j
P[n–j] Output signal delayed by j samples
N Maximum lag for the output signal coefficients $a_j$
Crossover Indicator—This indicator helps detect significant changes in pressure trends by identifying when short-term variations cross over, or go beyond, long-term averages. This parameter is critical when sampling at a high frequency of 50 ms, enabling timely responses to meaningful shifts while minimizing false positives.

The cross over indicator is given by the following three formulations (a), (b) and (c):

$$s[n] = \frac{P[n] - L_N}{H_N - L_N} \tag{a}$$

Where,
s[n] Normalized value of P[n] based on highest and lowest values over window N
P[n] Input signal at discrete time n
$L_N$ Lowest value of P over the last N samples
$H_N$ Highest value of P over the last N samples $$WMA[n] = \frac{\sum_{k=0}^{N-1} \omega_k \cdot P[n-k]}{\sum_{k=0}^{N-1} \omega_k} \qquad \text{(b)}$$

Where,

WMA[n] Weighted Moving Average at time n $\omega_k$ Weight applied to P[n−k] in Weighted Moving Average N Window size (number of samples)

P[n−k] Input signal delayed by k samples $$SMA[n] = \frac{1}{N} \sum_{k=0}^{N-1} P[n-k] \qquad \text{(c)}$$

Where,

SMA[n] Simple Moving Average at time n

P[n] Input signal at discrete time n

P[n−k] Input signal delayed by k samples

Rate of Change Indicator (ROC)—This indicator measures how quickly the pressure signal is changing over time, allowing detection of sudden or gradual rises or drops. This parameter augments the autoencoder feature set by incorporating the rate of pressure change over a specified time window and evaluating whether the observed dynamics are consistent with previously experienced patterns.

The primary formulation for the ROC indicator is:

$$s[n] = \frac{1}{1 + \dfrac{\sum_{j=0}^{N} g(j)}{\sum_{k=0}^{N} h(j)}}$$

Where, s[n] Normalized strength value at time n based on g(n) and h(n)

g(n) Positive part of the derivative of P at time n (zero if non-positive)

h(n) Negative part of the derivative of P at time n (zero if non-negative)

N Window size (number of samples for summation)

The equation for g(n) is given by, $$g(n) = \begin{cases} P'(n), & P'(n) > 0 \\ 0, & P'(n) \le 0 \end{cases}$$

Where,

P'(n) First derivative of P at time n

The equation for h(n) is given by, $$h(n) = \begin{cases} P'(n), & P'(n) < 0 \\ 0, & P'(n) \ge 0 \end{cases}$$

Where,

P'(n) First derivative of P at time n

Adaptive Setpoint & Adaptive Control—PID Controller—This controller dynamically adjusts both the target setpoint and control behavior based on real-time pressure trends. By integrating a PID controller-based algorithm into the autoencoder feature set, it is possible to model the dynamic response of pressure trends to real-world operational conditions.

The standard equation for PID controller is given by:

$$u[n] = K_p \cdot e[n] + K_i \sum_{k=0}^{n} e[k] \cdot \Delta t + K_d \frac{e[n] - e[n-1]}{\Delta t}$$

Where;

u[n] Control signal at time n $K_p$ Proportional gain constant e[n] Error signal at time n (setpoint-measured value)

$K_i$ Integral gain constant $\Delta t$ Sampling period (time interval between measurements)

$K_d$ Derivative gain constant e[n−1] Error signal at previous time step (n−1)·

Anomaly Ratio—The anomaly ratio quantifies the degree of abnormality in a pressure signal by evaluating how easily the data point can be isolated within an isolation tree structure. When this feature is combined with autoencoder reconstruction errors, the anomaly ratio enhances the system's ability to detect deviations from normal operational patterns. This dual approach leverages both feature-based isolation and reconstruction-based validation to improve the early identification of unexpected or rare pressure behaviors.

The anomaly ratio is represented by the following formulation:

$$s(x, n) = 2^{-\frac{E[h(x)]}{c(n)}}$$

Where s(x,n) Anomaly score for data point x based on normalized average path length E[h(x)] Expected average path length for data point x across the isolation trees c(n) Normalization factor for a dataset with n samples E[h (x)] is given by, $$E[h(x)] = \frac{1}{t} \sum_{i=1}^{t} h_i(x)$$

$h_i(x)$ Path length for data point x in tree i c(n) is given by, $$c(n) = 2H(n-1) - \frac{2 \cdot (n-1)}{n}$$

H(n−1) Harmonic number approximation for (n−1)

n Number of training samples (data points)

Figure 7:
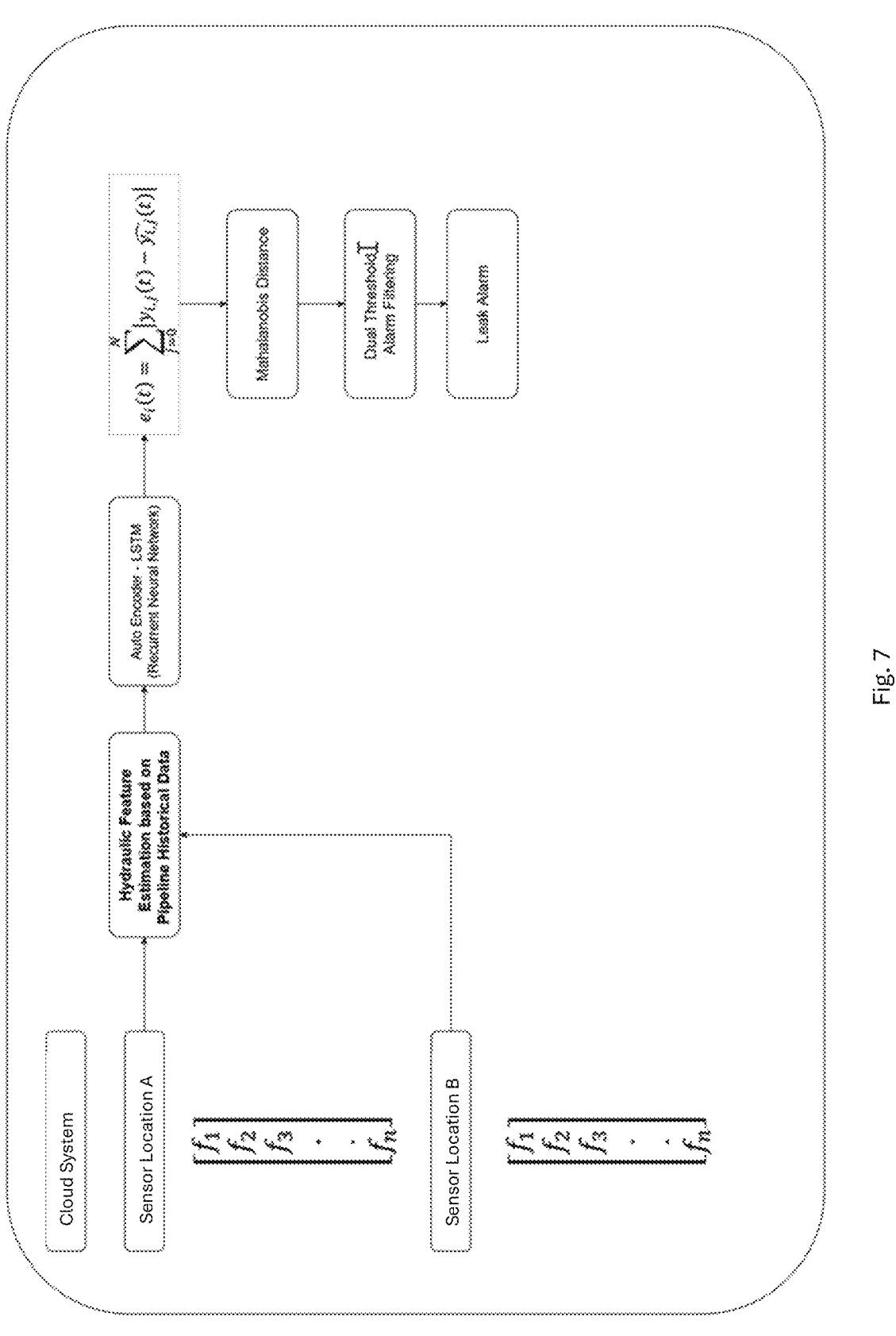
FIG. 7 is a further process diagram in relation to calculations performed at the cloud system of the present system.
Figure 8B:
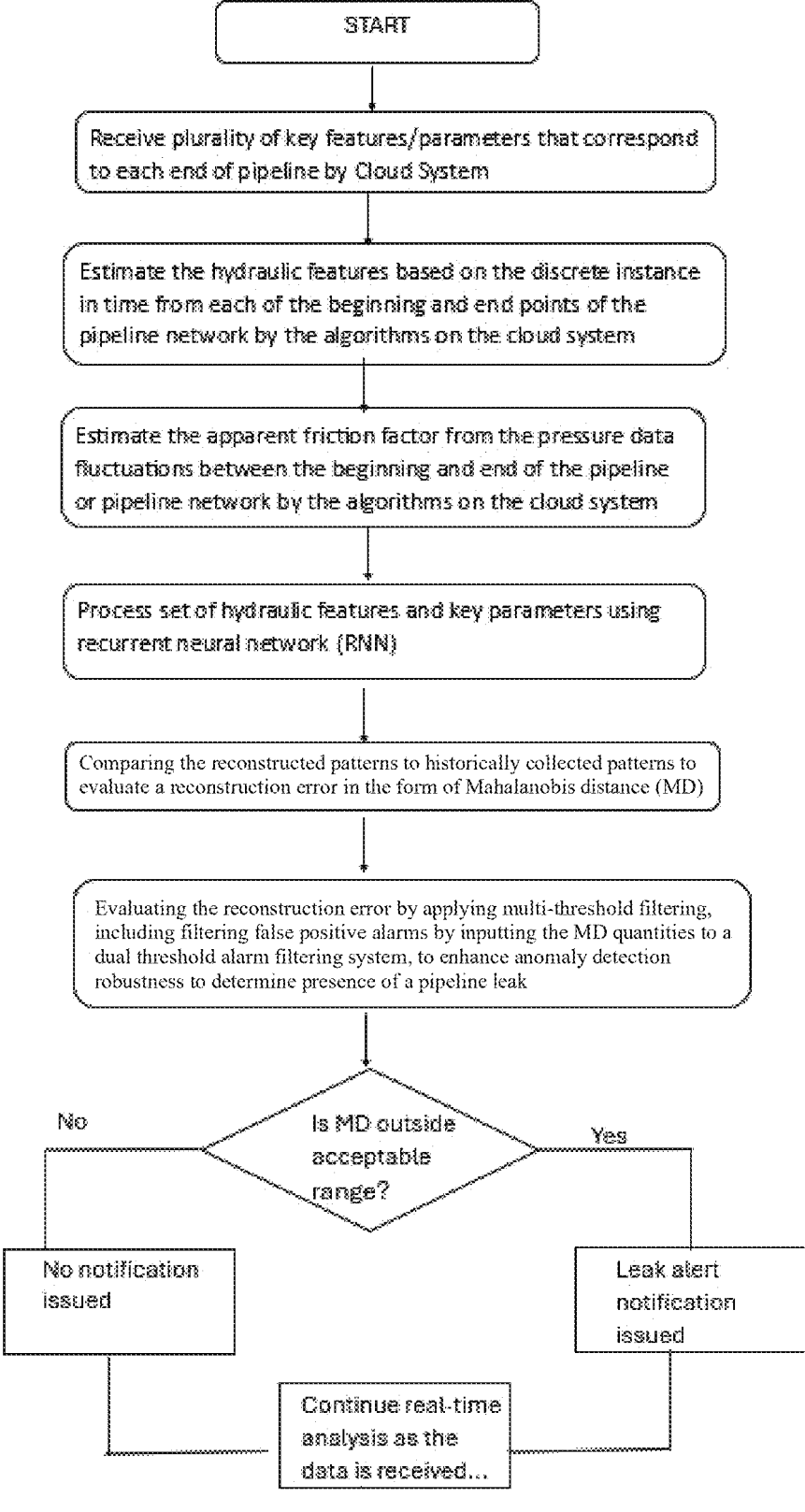
FIG. 8B is a process flow chart of steps taken in the present method at the cloud system.

The system at the cloud system is illustrated in FIG. 7 and a process flow chart of the method steps at the cloud system is illustrated in FIG. 8B. In one embodiment where sensor devices are placed at a beginning and an end point of the pipeline, then at the cloud system, the key features based on the discrete instance in time from each of the beginning and end points of the pipeline network are manipulated by the algorithms of the cloud processor to determine a hydraulic feature estimation.

Estimation of the hydraulic features is determined by constructing a pipeline-specific database to calculate allowable differential pressures (DPs) based on pressure behaviors observed during previous operating periods. This determines the dependency relationship between pressure sensor devices by analyzing historical operational data. This enables more accurate assessment of expected hydraulic conditions. The hydraulic feature is more preferably in the form of an apparent friction factor.

The hydraulic feature, together with the key parameters from each end of the pipeline are then processed in a recurrent neural network (RNN) of the present system. In an embodiment with only one pressure device collecting pressure data from a single point along the pipeline, the key features determined from the discrete pressure data from that single of the pipeline network are processed.

The recurrent neural network of the present system is an autoencoder that utilizes long short-term memory (LSTM). The reconstruction error of the pattern output of the present LSTM RNN autoencoder calculated by server on Cloud system is provided by the following expression:

$$e_i(t) = \sum_{j=0}^{N} |y_{i,j}(t) - \hat{y}_{i,j}(t)|$$

Where, $e_i(t)$=Reconstruction error for sample i at time t (sum of absolute differences between input and reconstructed output)

$|y_{i,j}(t)$=Input value to the autoencoder for sample i, feature index j, at time t (original data)

$\widehat{y_{i,j}}$ (t)=Reconstructed output from the autoencoder for sample i, feature index j, at time t (decoder output)

N=Dimension of input/output vectors (total number of features)

As such, the present system utilizes historically collected patterns from pipeline operation to mimic a potential output for comparison with the actual patterns derived from the key features and parameters. The comparison of the differences between the mimicked and actual patterns results in a calculation of the reconstruction error. In a preferred embodiment the reconstruction error is a Mahalanobis distance (MD). This quantifies how far a feature signal deviates from a multivariate normal distribution that is calculated based on historical pipeline operational data, accounting for correlations and variances between pressure sensors. It enables robust detection of anomalous behavior that may not be apparent from instantaneous sensor readings alone. The MD is a measurement of multidimensional distance, or standard deviation, between mimicked values for the key parameters.

Figure 9A:
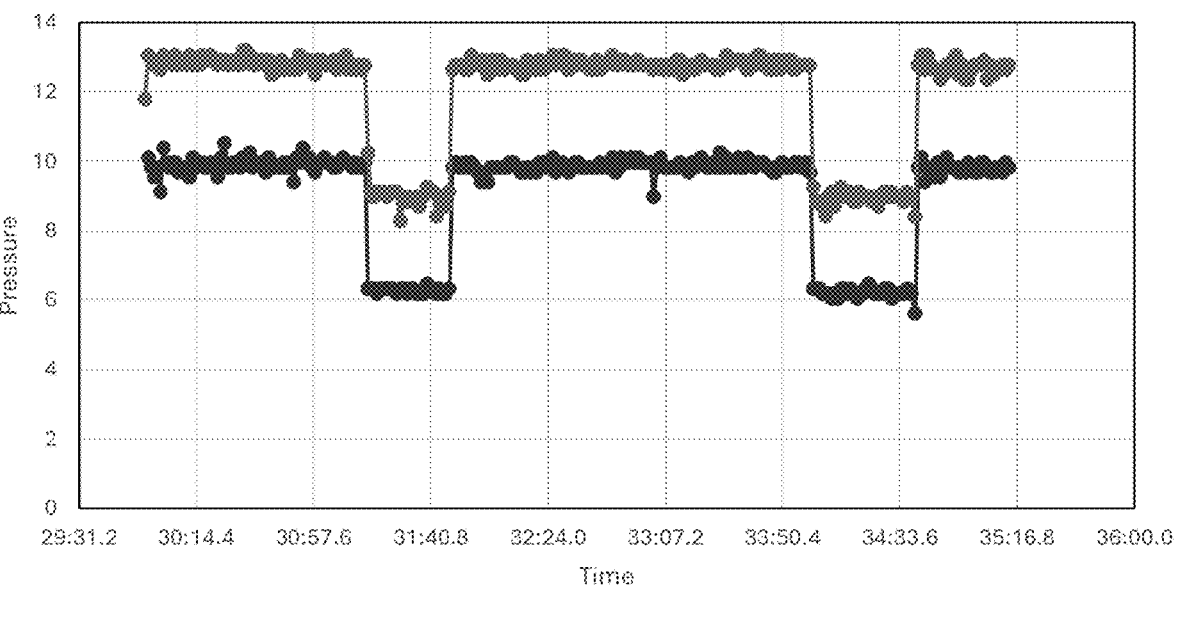
FIGS. 9A and 9B are graphs of sample historic data that can be used in the systems and methods of the present disclosure.
Figure 9B:
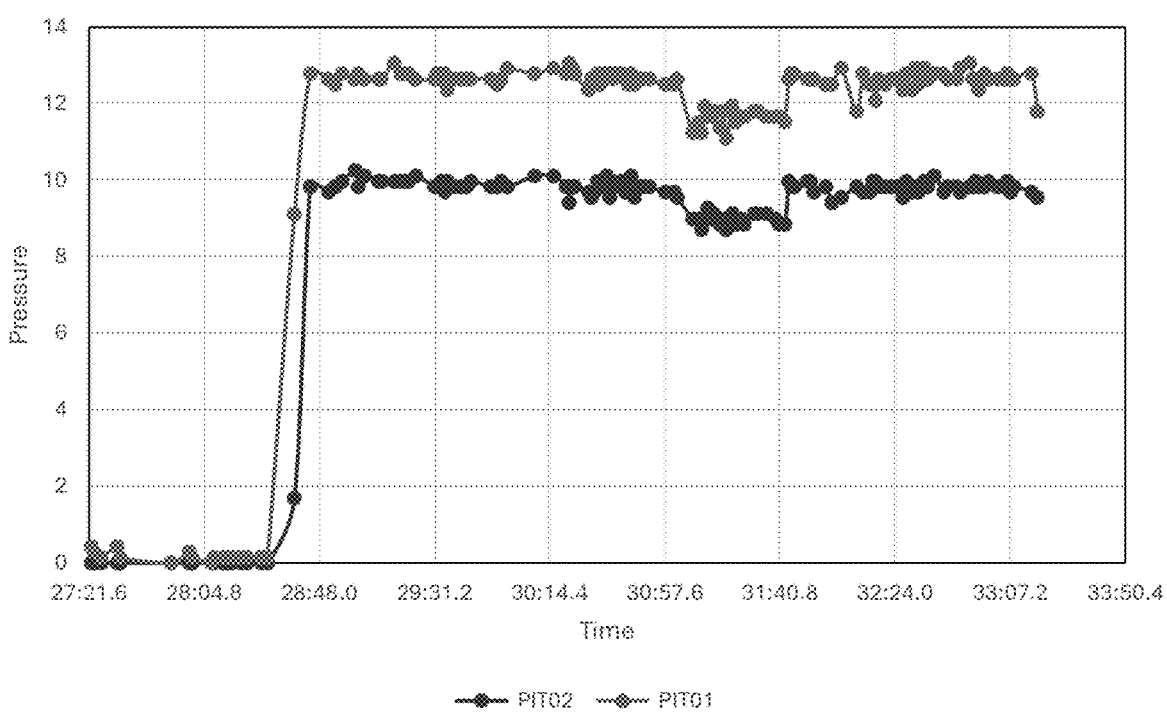
Figure 10:
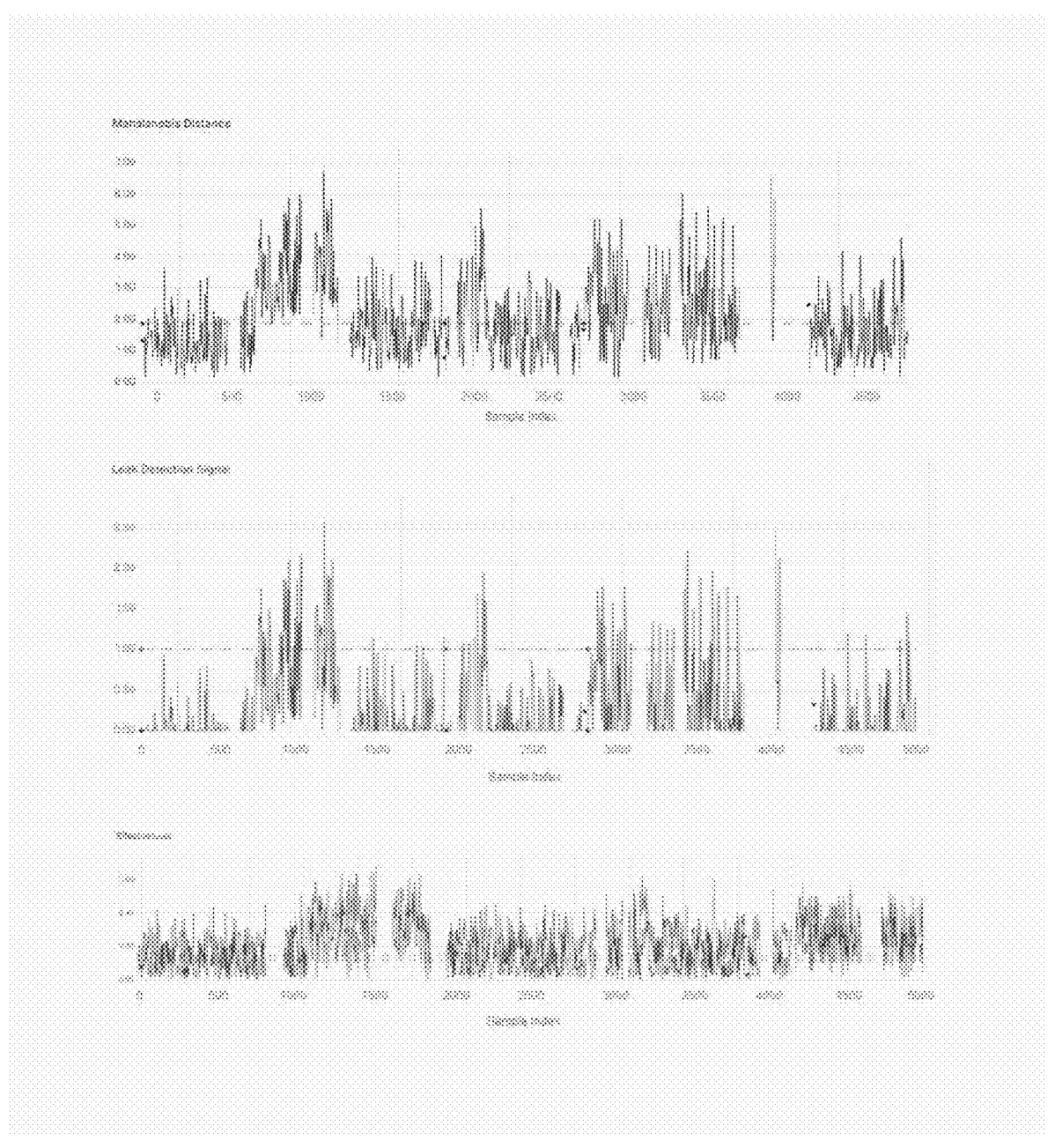
FIG. 10 shows plots of MD, leak detection signal and effective leak calculated for sample data.

The MD is fed to a multi-threshold, preferably a dual threshold (DT), alarm filtering system to ensure that any false alarms are filtered out. This filtering operates by evaluating the Mahalanobis distance of the pressure signal against two thresholds to enhance anomaly detection robustness. When the Mahalanobis distance exceeds the upper threshold, a timer initiates to measure the persistence of the deviation. If the anomaly persists beyond a configured duration, the system raises an alarm; if the distance falls below the lower threshold within the time window, the alarm condition is canceled, preventing false positives caused by transient disturbances. If the filtered Mahalanobis distance is outside of an acceptable range, then an anomaly has been detected that would indicate a pipeline leak and the leak alarm would sound. The equation for MD is given by:

$$D_M(x) = \sqrt{(x-\mu)^T S^{-1}(x-\mu)}$$

Where $D_M$=Mahalanobis distance f or a point x
$\mu$=is mean
S=Co variance matrix Sample historical data is shown in FIGS. 9A and 9B. Plots of the MD, leak detection signal and effective leak calculated for sample data are provided in FIG. 10.

The previous description of the disclosed embodiments is provided to enable any person skilled in the art to make or use the present disclosure. Various modifications to those embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

The invention claimed is:

1. A computer implemented method to detect pipeline leaks in a pipeline utilizing one or more sensor devices, each located adjacent the pipeline, the method comprising:

capturing, from each of the one or more sensor devices at its respective sensor location, discrete pipeline pressure measurements at discrete instances in time;

extracting, by a processor of an IoT Gateway associated with each of the one or more sensor devices, a plurality of key parameters from each of the captured discrete pipeline pressure measurements;

transferring, via the IoT Gateway, the plurality of key parameters to a cloud system located remotely and separate from the one or more sensor devices;

processing in the cloud system, the plurality of key parameters by using a recurrent neural network (RNN) to calculate and reconstruct patterns of the key parameters;

comparing the reconstructed patterns to historically collected patterns from pipeline operations to evaluate a reconstruction error in the reconstructed patterns; and evaluating the reconstruction error by applying multithreshold filtering to enhance anomaly detection robustness to determine presence of a pipeline leak.

2. The method of claim 1, wherein a nature and type of the plurality of key parameters is determined through historic leak simulation and prediction data to provide the plurality of key parameters that, after having been processed in the cloud system, indicates the presence of the pipeline leak.

3. The method of claim 2, wherein the one or more sensor devices comprises two sensor devices, located one at a beginning of the pipeline and one at an endpoint of the pipeline.

4. The method of claim 3, further comprising a step of estimating at least one hydraulic feature based on the discrete instances in time at each sensor location at the beginning of the pipeline and at the end point of the pipeline network.

5. The method of claim 4, wherein the at least one hydraulic feature is an apparent friction factor.

6. The method of claim 5, wherein the RNN is an LSTM (Long Short-Term Memory) based recurrent neural network (RNN) auto encoder.

7. The method of claim 6, wherein the reconstruction error is in the form of a Mahalanobis distance (MD).

8. The method of claim 7, wherein the one or more sensor devices stores historical data, and wherein the historical data are used to extract the plurality of key parameters.

9. The method of claim 1, wherein the pipeline can contain flowing fluid or standing fluid.

10. A computer system to detect pipeline leaks in a pipeline utilizing one or more sensor devices, each located at a corresponding sensor location adjacent the pipeline, the system comprising:

a processor and a memory of an IoT Gateway associated with each of the one or more sensor devices, wherein sensor instructions stored in the memory and executable by the processor instruct each sensor of the one or more sensor devices to:

capture discrete pipeline pressure measurements at discrete instances in time;

extract, by the processor of the IoT Gateway, a plurality of key parameters from each of the discrete pipeline pressure measurements; and transfer, via the IoT Gateway, the plurality of key parameters to a cloud system located remotely and separate from the one or more sensor devices, the cloud system comprising a cloud processor and a cloud memory, wherein cloud instructions stored in the cloud memory and executable by the cloud processor instruct the cloud system to:

receive the plurality of key parameters;

process the plurality of key parameters by using a recurrent neural network (RNN) to calculate and reconstruct patterns of the key parameters;

compare the reconstructed patterns to historically collected patterns from pipeline operations to determine a reconstruction error in the reconstructed patterns; and evaluate the reconstruction error by applying multi-threshold filtering to enhance anomaly detection robustness to determine presence of a pipeline leak.

11. The computer system of claim 10, wherein a nature and type of the plurality of key parameters is determined through historic leak simulation and prediction data to provide key parameters that, after having been processed in the cloud system, indicates the presence of the pipeline leak.

12. The computer system of claim 11, wherein the one or more sensor devices comprises two sensor devices, located one at a beginning of the pipeline and one at an endpoint of the pipeline.

13. The computer system of claim 12, further comprising a step of estimating at least one hydraulic feature based on the discrete instances in time at each sensor location at the beginning of the pipeline and at the end point of the pipeline network.

14. The computer system of claim 13, wherein the at least one hydraulic feature is an apparent friction factor.

15. The computer system of claim 14, wherein the RNN is an LSTM (Long Short-Term Memory) based recurrent neural network (RNN) auto encoder.

16. The computer system of claim 15, wherein the reconstruction error is in the form of a Mahalanobis distance (MD).

17. The computer system of claim 16, wherein the one or more sensor devices stores historical data, and wherein the historical data are used to extract the plurality of key parameters from the discrete pipeline pressure measurements.

18. The computer system of claim 10, wherein the pipeline can contain flowing fluid or standing fluid.

19. A non-transitory computer-readable medium containing program instructions for causing a computer to perform operations comprising:

capturing by one or more sensor devices, each located at one or more sensor locations adjacent the pipeline, discrete pipeline pressure measurements at discrete instances in time at each sensor location;

extracting, by a processor and a memory of an IoT Gateway associated with each of the one or more sensor devices, a plurality of key parameters from each of the discrete pipeline pressure measurements;

transferring, by the IoT Gateway, the plurality of key parameters to a cloud system located remotely and separate from the one or more sensor devices;

processing in the cloud system, the plurality of key parameters by using a recurrent neural network (RNN) to calculate and reconstruct patterns of the key parameters;

comparing the reconstructed patterns to historically collected patterns from pipeline operations to determine a reconstruction error in the reconstructed patterns; and evaluating the reconstruction error by applying multi-threshold filtering to enhance anomaly detection robustness to determine presence of a pipeline leak.

* * * * *